United States Patent Office

3,606,790
Patented Sept. 21, 1971

3,606,790
METHOD FOR MEASURING AIR-FUEL RATIO
Hiroshi Matsumoto and Kenji Goto, Toyota, Japan, assignors to Toyota Jidosha Kogyo Kabushiki Kaisha, Toyota, Aichi Prefecture, Japan
Filed Jan. 21, 1969, Ser. No. 792,430
Claims priority, application Japan, Jan. 23, 1968, 43/3,485
Int. Cl. G01n 27/18
U.S. Cl. 73—27                        1 Claim

ABSTRACT OF THE DISCLOSURE

Method for measuring air-fuel ratio of combustible mixture by analyzing exhaust gas from engine supplied with mixture comprises steps of comparing thermal conductivity of standard gas with thermal conductivity of gas sample and thereafter obtaining from comparison a first voltage value representative of the $H_2$ and $CO_2$ content of the exhaust gas. Thermal conductivity of exhaust gas sample is then compared with exhaust gas sample having no $CO_2$ content and from comparison second voltage value representative of $CO_2$ content of exhaust gas sample is obtained. Second voltage value is subtracted from first voltage value to thereby obtain third voltage value representative of air-fuel ratio of combustible mixture. Ratio of second voltage value to first voltage value is constant somewhere between less than ten and more than one.

BACKGROUND OF THE INVENTION

The present invention relates to a method for measuring the air-fuel ratio of a fuel mixture supplied to a running engine by sampling the exhaust gas and measuring its thermal conductivity.

Conventional methods of measuring air-fuel ratios include the following:

(1) Air intake and fuel supply are measured separately and calculated at the same time on the charging side of the engine.

(2) The exhaust gas is sampled on the discharge side of the engine and the sampling is put to quantitative chemical analysis.

(3) The exhaust gas is sampled on the discharge side of the engine and the measured thermal conductivity of the sample gas is converted to an air-fuel ratio.

Method (3) is suitable for continuous measurement. It is simple and convenient and a gas analyzer based on this method is commercially available under the name of Mix Ratio Meter. With this meter utilizing the facts that the contents of $H_2$ and $CO_2$ in an exhaust gas make notable variations with a change in the air-fuel ratio, and also that the thermal conductivities of $H_2$ and $CO_2$ are respectively about 7.1 times and about 0.61 times that of the air, an exhaust gas chamber and an air chamber are connected to a Wheatstone bridge so that the change in air-fuel ratio is converted to a change in the unbalanced voltage of the bridge, and the scale of the detector for the voltage variation is given in terms of air-fuel ratio. The one which refers to $H_2$ component is called the $H_2$ analyzer and the one which refers to $CO_2$ component is called the $CO_2$ analyzer. These analyzers, however, are unsatisfactory with respect to the range and accuracy of measurement and the speed of response. Moreover, it was heretofore believed that to overcome these disadvantages complicated and expensive mechanisms would be required.

SUMMARY OF THE INVENTION

In accordance with the present invention a method is provided for measuring the air-fuel ratio of a combustible mixture by analyzing an exhaust gas from an engine supplied with the mixture. This method comprises the steps of comparing the thermal conductivity of a standard gas with the thermal conductivity of an exhaust gas sample. From this comparison a first voltage value is provided which is representative of the $H_2$ and $CO_2$ content of the exhaust gas. A second comparison is made between the thermal conductivity of the exhaust gas sample and a similar sample without any $CO_2$ content. The second comparison provides a second voltage value which is representative of the $CO_2$ content of the exhaust gas sample. By subtracting the second voltage value from the first voltage value the third voltage value is obtained which is representative of the air-fuel ratio of the combustible mixture. The ratio of the second voltage value to the first voltage value is constant somewhere between less than ten and more than one.

Also, the present method for measuring the air-fuel ratio of a combustible mixture may be continuous and the standard gas utilized in the first comparison can be steam saturated air. Preferably, the ratio of the second voltage value to the first voltage value is between three and seven.

BRIEF DESCRIPTION OF THE DRAWING

Novel features and advantages of the present invention in addition to those mentioned above will become apparent to one skilled in the art from a reading of the following detailed description in conjunction with the accompanying drawing wherein.

DETAILED DESCRIPTION OF THE INVENTION

Figure 1:
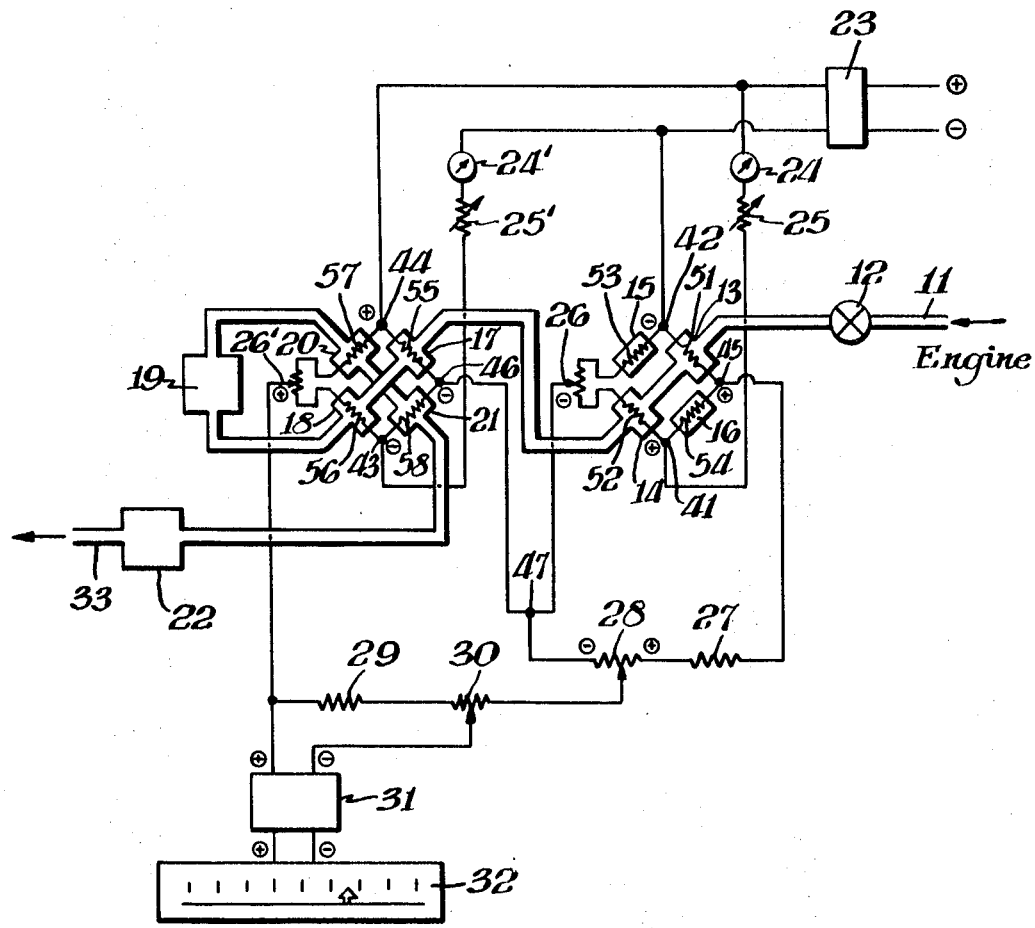
FIG. 1 is a block diagram of an exhaust gas analyzer for measuring air-fuel ratios according to the present invention.

As shown in FIG. 1, there are installed resistance wire chambers 15, 16 which hold steam-saturated air or another similar gas having an equivalent thermal conductivity sealed in or passed through the chambers as a standard gas. The chambers include resistance wires 53, 54. Resistance wire chambers 13, 14, 17, 18, 20 and 21 are also provided and these chambers include resistance wires 51, 52, 55, 56, 57 and 58, respectively. The chambers communicate with one another with entrances and exits for passing the exhaust gas. The exhaust gas is introduced through an exhaust gas entrance 11 and flows through a valve 12 into resistance wire chambers 13, 14, 17, 18. From chamber 18 the gas passes through a $CO_2$ absorption chamber 19 where $CO_2$ in the exhaust gas is absorbed by strong alkaline agents such as KOH solution and the like. After $CO_2$ is removed the gas travels through the resistance wire chambers 20, 21, and is then sucked by a pump 22 and discharged into the atmosphere through a port 33. The resistance wires 51, 52, 53, and 54, which are designed to have as near the same resistance as possible, constitute the first Wheatstone bridge, 41, 42 being loading terminals and 45, 26 being output terminals. Similarly the resistance wires 55, 56, 57 and 58 constitute the second Wheatstone bridge, 43, 44 being loading terminals and 46, 26' being output terminals.

A voltage stabilizer 23 is provided which keeps the voltage of the external loading source at a specified value and supplies this voltage to the bridges. One terminal wire of the stabilizer runs through an ammeter 24 which indicates the supply current and then through a variable resistance 25 which adjusts the supply current. From the resistance 25 it leads to the loading terminal 41 of the first Wheatstone bridge. The voltage runs directly to the loading terminal 44 of the second Wheatstone bridge. The other terminal wire of the stabilizer 23 passes through the loading terminal 42 of the first Wheatstone bridge, an ammeter 24' and a variable resistance 25', and is connected to the loading terminal 43 of the second Wheatstone bridge.

Meanwhile, the output terminal 26 of the first Wheatstone bridge and the output terminal 46 of the second Wheatstone bridge are connected at a junction 47 and further joined to one side of a potentiometer 28 which adjusts the operating ratio. The output terminal 45 of the first Wheatstone bridge is joined via an auxiliary resistance 27 for adjusting the operating ratio to the other side of the potentiometer 28. The output terminal of the potentiometer 28 is connected to one side of an output-adjusting potentiometer 30, the other side of which is via an output-adjusting auxiliary resistance 29 connected to the output terminal 26' of the second Wheatstone bridge and to one of the input terminals of an output voltage-amplifying amplifier 31. The output terminal of the potentiometer 30 is connected to the other terminal of the amplifier 31. The output voltage amplified by the amplifier 31 is applied on an indicator or recorder 32 indicating the output voltage. The indicator is provided with a scale for converting to air-fuel ratios.

In FIG. 1 the signs +, − attached to the terminals represent the electric polarity at which the air-fuel ratio of exhaust gas is equal to the theoretical air-fuel ratio. Practically they are determined only when the exhaust gas is passed.

To measure the air-fuel ratio by means of this arrangement the suction pump 22 is started and the voltage stabilizer 23 is connected to the external loading source after proper adjustment of the piping and the electric circuitry. The heat dissipation from the resistance wires 51, 52 exposed to the exhaust gas differs from that of the wires 53, 54 existing in the standard gas because the thermal conductivity of the exhaust gas containing $H_2$ and $CO_2$ is not the same as that of the standard gas in the resistance wire chambers 15, 16. Thus, from the output terminals 45 and 26 of the first bridge the difference in thermal conductivity between the standard gas and the exhaust gas is known, that is, the unbalanced voltage $E_1$ proportional to the content of $H_2$—$CO_2$ mixture in the exhaust gas.

Next, the exhaust gas which has passed through the resistance wire chambers 17, 18 is deprived of its $CO_2$ component in the $CO_2$ absorption chamber 19. It then goes through the resistance wire chambers 20, 21, to be sucked by the pump 22. Since the thermal conductivity of exhaust gas with no $CO_2$ is different from that of exhaust gas with $CO_2$ the heat dissipation from the wires 57, 58 differs from that of the wires 55, 56. Accordingly, from the output terminals 46 and 26' of the second bridge the difference in thermal conductivity between the $CO_2$-containing exhaust gas and the non $CO_2$-containing exhaust gas is known, that is, the unbalanced voltage $E_2$ proportional to the $CO_2$ content of the exhaust gas. In this case, the gas analyzer connected to the second bridge alone will be the same as the conventional $CO_2$ analyzer.

When the unbalanced voltage $E_2$ of the second bridge is subtracted from the unbalanced voltage $E_1$ of the first bridge, an unbalanced voltage E proportional only to the $H_2$ content of the exhaust gas is known.

In the operating circuit for this subtraction which is composed of the auxiliary resistance 27 and the potentiometer 28, the ratio of $E_2$ to $E_1$ is set larger than 1. The unbalanced voltage E thus obtained is amplified by the amplifier 31 and indicated or recorded by the indicator or recorder 32.

The above description concerns the function in the case of the air-fuel ratio remaining constant. When this ratio changes the $H_2$ and $CO_2$ contents of the exhaust gas respectively change. Thus, the unbalanced voltages $E_1$ and $E_2$ of both bridges change and the unbalanced voltage E obtained through subtraction changes. Thus, the indication or recording on the indicator or recorder 32 makes continuous variation following the unbalanced voltage E.

The gas analyzer according to this invention can make accurate measurements over a wide range of air-fuel ratio from the most concentrated to the least concentrated value in practical engines, as explained more fully below.

Figure 2:
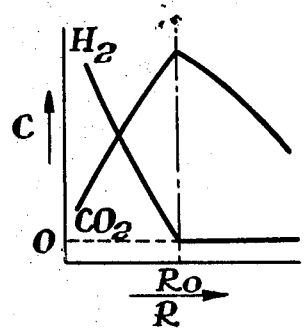
FIGS. 2 to 7 are graphs illustrating the change of the exhaust gas characteristics relative to air-fuel ratio.

As indicated in FIG. 2 which illustrates the relation between the valve of C representing the $H_2$—$CO_2$ contents of exhaust gas and the air-fuel ratio R, $H_2$ has an inflection point near the theoretical air-fuel ratio $R_0$ (about 15.2:1). On the more concentrated side beyond this point $H_2$ rises sharply while on the less concentrated side $H_2$ tends toward zero (no $H_2$ contained). $CO_2$ reaches a maximum value near $R_0$, with the tendency of near-linearly decreasing toward the more and the less concentrated sides.

Figure 3:
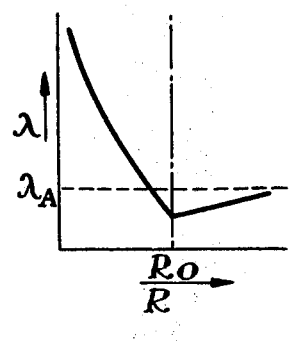

As indicated in FIG. 3, the thermal conductivity $\lambda$ for the exhaust gas as a whole is at minimum around $R_0$ unlike the thermal conductivity $\lambda_A$ of standard air. On the more concentrated side of this minimum it tends to make a sharp near-linear increase and on the less concentrated side it tends to make a mild, near-linear increase. This is because, as stated at the outset, in the thermal conductivity of exhaust gas unlike $\lambda_A$ of standard air, $H_2$ has an extremely high value of thermal conductivity and $CO_2$ has a very low value. The thermal conductivities of the other elements in the exhaust gas are constant and practically the same as that of air or the contents of these other elements are quite a little in the exhaust gas.

Figure 4:
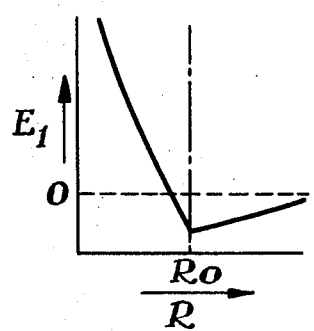

FIG. 4 shows the change of thermal conductivity $\lambda$ in FIG. 3 as converted to that of the unbalanced voltage $E_1$. If the output terminal 26 of the first bridge is adjusted so as to make the output voltage on the air side equal to zero, the mixed content of $H_2$ and $CO_9$ referring to the standard air will have its minium around the theoretical air-fuel ratio $R_0$, tending on the more concentrated side of it to cause a sharp, linear increase of unbalanced voltage $E_1$ and on the less concentrated side of it to cause a mild, near-linear increase of unbalanced voltage $E_1$.

The $E_1$ in FIG. 4 is the unbalanced voltage gained from the output terminals 26, 45 of the first bridge and it gives a curve similar to the change of thermal conductivity $\lambda$ shown in FIG. 3. The $E_1$ of FIG. 4 is just the $E_1$ gained from the first bridge of FIG. 1.

Figure 5:
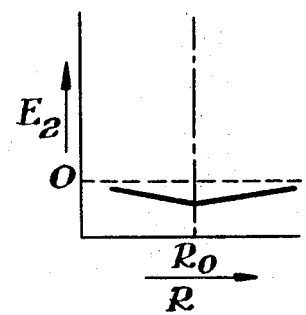

Next, FIG. 5 illustrates the changes of the unbalanced voltage $E_2$ gained from the second bridge and of the air-fuel ratio R. If the output terminal 26' of the second bridge is adjusted so that the output voltage may become equal to zero when the exhaust gas contains no $CO_2$, the mixed content of $H_2$ and $CO_2$ referring to $H_2$ will have its minimum around the theoretical air-fuel ratio $R_0$, tending to make a mild, near-linear increase on both the more and the less concentrated sides of air-fuel ratio. This is an opposite tendency to that of the $CO_2$ curve in FIG. 2.

Thus, $E_1$ is a voltage changing in proportion to the mixed content of $H_2$ and $CO_2$, $E_2$ is a voltage changing in proportion to the $CO_2$ content, and subtraction of $E_2$ from $E_1$ at 1:1 will give a voltage E' which represents the $H_2$ in proportion to the air.

Figure 6:
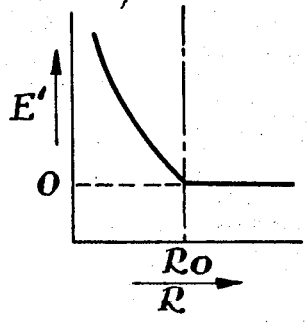

In the conventional gas analyzer the relation between the unbalanced voltage E' and air-fuel ratio R is as shown in FIG. 6, which gives a similar $H_2$ curve to the one shown in FIG. 2. Thus, the conventional gas analyzer is nothing but an $H_2$ analyzer.

Figure 7:
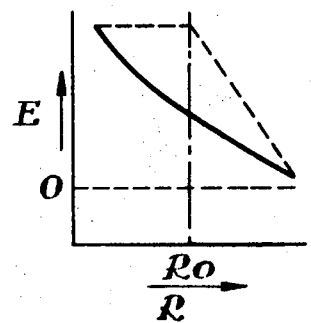

According to this invention, however, in which the operation is made not with the ratio of $E_2$ to $E_1$ set at 1 but larger than 1, the relation between unbalanced voltage E and air-fuel ratio R is as shown in FIG. 7. The voltage tends to decrease near-linearly from the more concentrated side of air-fuel ratio R to the less concentrated side of it and the inflection point around the theoretical air-fuel ratio $R_0$ becomes ambiguous.

Of course, this ratio can be set at arbitrary values through design and adjustment of the auxiliary resistance 27 and the potentiometer 28. The one in FIG. 7 is nearly in a straight line.

In the conventional measurement of air-fuel ratio using the $H_2$ analyzer referred to $H_2$ content, as seen in FIG. 6 in which the air-fuel ratio is less concentrated than the theoretical air-fuel ratio $R_0$, the unbalanced voltage $E'$ remains nearly constant and in consequence the measurement of air-fuel ratio on this less concentrated side becomes uncertain. In the measurement using the conventional $CO_2$ analyzer, which is more simplified in structure than the $H_2$ analyzer, as illustrated in FIG. 5 the unbalanced voltage $E_2$ is approximately symmetrical on both the more and the less concentrated sides of the theoretical ratio $R_0$ and accordingly, it is impossible to distinguish between the more and the less concentrated air-fuel ratios.

On the other hand, the $H_2$—$CO_2$ analyzer for measuring the air-fuel ratio is of the similar structure to the $CO_2$ analyzer, but it is nothing more than a $CO_2$ analyzer with minimum value around the theoretical ratio $R_0$ and will only be available for a limited range of the more concentrated side of the air-fuel ratio.

Thus, it may be said that conventional gas analyzers and conventional methods of air-fuel ratio measurement have their applications generally limited to a range of the more concentrated side of the theoretical air-fuel ratio $R_0$. Alternatively, they may be applied in combination with some other method for distinguishing whether the air-fuel ratio R is more concentrated or less concentrated than the theoretical air-fuel ratio $R_0$, which has been the serious drawback to the conventional analyzers and measuring methods.

Usually, the air-fuel ratio in gasoline engines wth carburetors is set between about 12:1 for maximum output and about 15:1 for minimum fuel consumption. The ratio for minimum fuel consumption is close to the theoretical air-fuel ratio, i.e., 15.2:1 and use of the gas analyzer for measuring the air-fuel ratio around this value will not produce reliable results. In the measurements in the research-test-production process the necessity occurs for investigating a wider range than the above, and in the case of a gasoline-jet engine or a diesel engine a still wider range of measurements is necessary.

According to this invention, the unbalanced voltage changes over the whole necessary range and there is no likelihood of this unbalanced voltage increasing on both sides of the theoretical air-fuel ratio $R_0$; thus the measurement of air-fuel ratio over a wide range is possible. And the maximum ratio of $E_2$ to $E_1$ has been found to be about 10 for the following reason: When the ratio of $E_2$ to $E_1$ is stepped up, the inflection point steadily shifts upward in the diagram and when a certain ratio is attained, as indicated by the dotted line in FIG. 7, the curve becomes nearly straightened on the more concentrated side of air-fuel ratio.

Under this condition the same state as with $E'$ in the $H_2$ analyzer in FIG. 6 will occur, that is, the air-fuel ratio R will become uncertain on the more concentrated side because the ratio of $E_2$ to $E_1$ is nearly equal to 10 and accurate measurement becomes impossible. On the other hand at less than the lower limit of $E_2/E_1$ value, i.e., less than 2, the inflection point near the theoretical air-fuel ratio $R_0$ becomes too much elucidated and the sensitivity on the less concentrated side of air-fuel ratio drops— which prevents full play given to this invention. If the $E_2/E_1$ ratio is gradually increased from 2, the inflection point practically disappears and the sensitivity difference between two sides of theoretical ratio $R_0$ will be almost eliminated to great convenience in application. If this ratio is set too large, as stated above the inflection point will be somewhat elucidated and the sensitivity on the more concentrated side of air-fuel ratio will become dull. For practical purposes, the effective range of this ratio will be 3 to 7 considering the nature of exhaust gas and the performance of the gas analyzer.

In the gas analyzer and method of this invention, as explained above, there is no possibility of the unbalanced voltage increasing on both sides of the theoretical air-fuel ratio $R_0$ and accordingly the indication of voltage always corresponds to the air-fuel ratio. Thus, this gas analyzer and method will be enough for measuring the whole range of air-fuel ratios without resorting to any other aid.

Meanwhile, it becomes possible to set arbitrarily the sensitivity of the gas analyzer by appropriately choosing the ratio value of $E_2$ to $E_1$, that is, the rate of fine variation in the indication of unbalanced voltage in accordance with fine change in the air-fuel ratio. At the same time, the sensitivity difference between both sides of the theoretical air-fuel ratio $R_0$ can be so minimized as to be practically negligible. Moreover, this sensitivity may be fixed or may be varied for every measurement. These features of the present analyzer and method are realized by a simple operating circuit, therefore the analyzer and method are easy and inexpensive to use. Thus, the gas analyzer and method according to this invention will be available not only for research and experiment, but also for engine inspection at mass production plants or for engine servicing at servicing plants, where conventional expensive analyzers and complicated methods cannot be used.

What is claimed is:

1. A method for continuously measuring the air-fuel ratio of a combustible mixture by analyzing the exhaust gas from an engine supplied with the mixture comprising the steps of comparing the thermal conductivity of a standard gas with the thermal conductivity of an exhaust gas sample and thereafter obtaining from this comparison a first voltage value representative of the $H_2$ and $CO_2$ content of the exhaust gas, next comparing the thermal conductivity of the exhaust gas sample with the thermal conductivity of the exhaust gas sample after the $CO_2$ content is removed therefrom and thereafter obtaining from this second comparison a second voltage value representative of the $CO_2$ content of the exhaust gas sample, subtracting the second voltage value from the first voltage value to obtain a third voltage value representative of the air-fuel ratio of the combustible mixture, and maintaining the ratio of the second voltage value to the first voltage value constant somewhere between three and seven.

References Cited

UNITED STATES PATENTS

| | | | |
|---|---|---|---|
| 1,530,202 | 3/1925 | Rodhe | 73—27X |
| 2,168,236 | 8/1939 | Pick | 23—232 |
| 2,591,761 | 4/1952 | Zaikowsky | 73—27 |
| 2,633,737 | 4/1953 | Richardson | 73—27 |
| 2,698,223 | 12/1954 | Richardson | 73—27X |

RICHARD C. QUEISSER, Primary Examiner

C. E. SNEE III, Assistant Examiner